US011004333B2

(12) United States Patent
Xu et al.

(10) Patent No.: US 11,004,333 B2
(45) Date of Patent: May 11, 2021

(54) DETECTING INFLUENTIAL FACTORS FOR TRAFFIC CONGESTION

(71) Applicant: INTERNATIONAL BUSINESS MACHINES CORPORATION, Armonk, NY (US)

(72) Inventors: Jing James Xu, Xian (CN); Jing Xu, Xian (CN); Jun Wang, Xian (CN); Xiaoyang Yang, San Francisco, CA (US); Ji Hui Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 16/205,072

(22) Filed: Nov. 29, 2018

(65) Prior Publication Data

US 2020/0175853 A1 Jun. 4, 2020

(51) Int. Cl.
*G08G 1/01* (2006.01)
*G06F 17/16* (2006.01)
*G06F 7/08* (2006.01)

(52) U.S. Cl.
CPC .............. *G08G 1/0125* (2013.01); *G06F 7/08* (2013.01); *G06F 17/16* (2013.01)

(58) Field of Classification Search
CPC .......... G08G 1/0125; G06F 7/08; G06F 17/16
See application file for complete search history.

(56) References Cited

U.S. PATENT DOCUMENTS

| 6,587,781 | B2 | 7/2003 | Feldman et al. |
| 8,606,727 | B2 | 12/2013 | Wu et al. |
| 2013/0218427 | A1* | 8/2013 | Mukhopadhyay .... B60W 40/09 701/51 |
| 2018/0126995 | A1 | 5/2018 | Caballero De Ita et al. |
| 2018/0174443 | A1 | 6/2018 | Fowe et al. |
| 2019/0266891 | A1* | 8/2019 | Zhong ................. G08G 1/0137 |
| 2019/0362219 | A1* | 11/2019 | Scheffler ................. G06N 3/10 |

FOREIGN PATENT DOCUMENTS

WO 2018118945 A2 6/2018

OTHER PUBLICATIONS

Mell et al., "The NIST Definition of Cloud Computing," National Institute of Standards and Technology, Sep. 2011, p. 1-3, Special Publication 800-145.

* cited by examiner

*Primary Examiner* — Peter D Nolan
*Assistant Examiner* — AShley L Redhead, Jr.
(74) *Attorney, Agent, or Firm* — Robert R. Aragona

(57) ABSTRACT

A method, computer system, and a computer program product for detecting a plurality of influential factors for traffic congestion is provided. The present invention may include identifying one or more influential roads and one or more influential routings associated with an object road in a target road network. The present invention may also include quantifying an impact associated with the identified one or more influential roads and the identified one or more influential routings associated with the object road, wherein at least one Impact Matrix is utilized to determine a road-by-road influence in connection to the target road network.

17 Claims, 5 Drawing Sheets

DETECTING INFLUENTIAL FACTORS FOR TRAFFIC CONGESTION

BACKGROUND

The present invention relates generally to the field of computing, and more particularly to traffic management.

Traffic congestion is a major problem for city development, which involves daily transport management and urban planning, and has led to critical issues including energy consumption and air pollution. Currently, traffic control, by utilizing traffic lamps and officers, is used to ease congestion. However, traffic lamps cannot be automatically adjusted by the related road network real-time traffic status, and an officer's ability to control traffic heavily depends on the officer's experience and expertise.

SUMMARY

Embodiments of the present invention disclose a method, computer system, and a computer program product for detecting a plurality of influential factors for traffic congestion. The present invention may include identifying one or more influential roads and one or more influential routings associated with an object road in a target road network. The present invention may also include quantifying an impact associated with the identified one or more influential roads and the identified one or more influential routings associated with the object road, wherein at least one Impact Matrix is utilized to determine a road-by-road influence in connection to the target road network.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
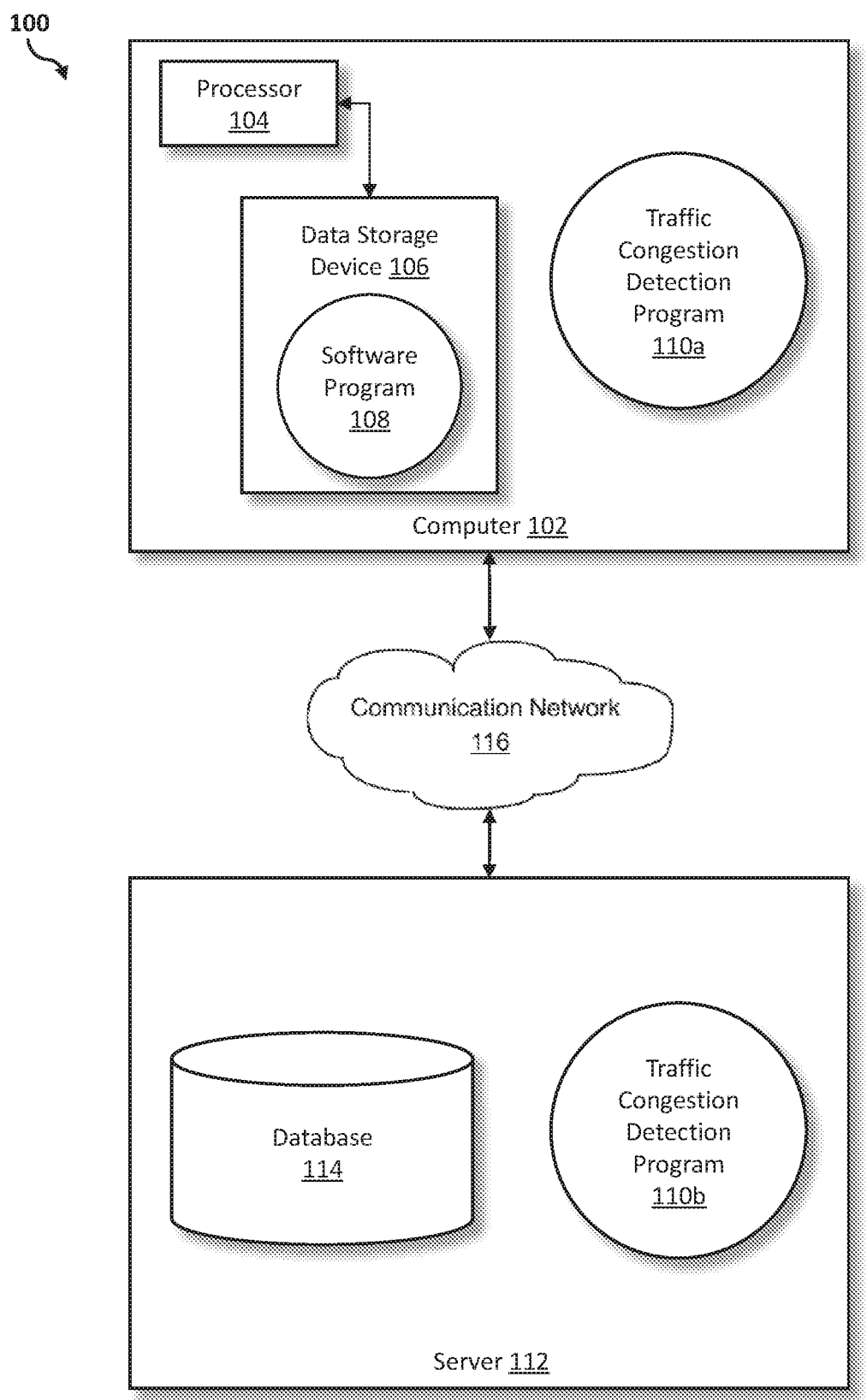
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for detecting a plurality of influential factors for traffic congestion. As such, the present embodiment has the capacity to improve the technical field of traffic management by identifying the influential adjacent roads and routings for an object road, and quantifying the strength of influence for the identified influential roads and routings associated with the object road. More specifically, the present embodiment may detect influential roads from the first and second level adjacent roads and influential routings by computing an Impact Matrix (including first order Impact Matrix and second order Impact Matrix) to describe the influence among the road network, and use detected results to pre-estimate the traffic results by, for example, "what-if" analysis.

As previously described, traffic congestion is a major problem for city development, which involves daily transport management and urban planning, and has led to critical issues including energy consumption and air pollution. Currently, traffic control, by utilizing traffic lamps and officers, is used to ease congestion. However, traffic lamps cannot be automatically adjusted by the related road network real-time traffic status, and an officer's ability to control traffic heavily depends on the officer's experience and expertise.

Therefore, it may be advantageous to, among other things, detect influential roads and routings for designated traffic congestion by considering the impact that adjacent roads may have on an object road, determining the factors that impact the object road, determining how temporal and spatial relationships affect traffic congestion, and quantifying the impact and the relationships.

According to at least one embodiment, the traffic congestion detection program may identify the roads and routings that may be most relevant for a specified congested road section, and measure the impact those factors have on traffic patterns. After performing the, for example, "what-if" analysis for real road network traffic simulations to control "what" (i.e., traffic) through changing "if" (i.e., factors), the findings of the "what-if" analysis may be applied to other congested roads in the road network to improve the entire traffic system.

According to at least one embodiment, the traffic congestion detection program may utilize a statistical detection method to deploy traffic management and early-warning system in real-time and automatically by identifying influential roads and/or routings for a target road (i.e., object road). Additionally, the traffic congestion detection program may quantify the impact of influential factors (e.g., police power, traffic signals, inclement weather conditions, road conditions) to prioritize traffic resource allocation and thereby create a more concrete and valuable method of traffic management to ease congestion.

According to at least one embodiment, the traffic congestion detection program may compute an Impact Matrix to describe the influence among the road network. Then, for a given road, the traffic congestion detection program may detect influential roads from the first level roads, then from the second level roads, and further the influential routings. The traffic congestion detection program may utilize detected results to pre-estimate the traffic results by utilizing, for example, a "what-if" analysis.

According to at least one embodiment, the Impact Matrix (including first order Impact Matrix and second order Impact Matrix) may be computed by the traffic congestion detection program. The Impact Matrix may give road-by-road influence among a road network within the scope of study. Some of the sources of information may be utilized to compute the Impact Matrix, including spatial correlation (dependency), network topology, and time-delay estimation, where the spatial correlation may be necessary.

According to at least one embodiment, the spatial correlation (or dependency) may measure the spatial influence between two roads (e.g., the spatial correlation between road_A and road_B may be denoted as spatial_corr(A,B)). A high spatial correlation may signify that the traffic status of the two roads are statistically stronger relation with each other, or otherwise, the status may not be dependent on each other. As such, several existing methods may be utilized by the traffic congestion detection program to provide such a spatial correlation matrix, such as Statistical Package for the Social Sciences (SPSS) 'Spatial Temporal Prediction' model, or other spatial analysis methods (e.g., spatial auto-correlation and spatial regression). The traffic congestion detection program may denote the spatial correlation matrix of the road network as $\Sigma$.

According to at least one embodiment, the traffic congestion detection program may utilize some other sources of information for the Impact Matrix (including first order Impact Matrix and second order Impact Matrix). The Network Topology structure, denoted as T, may be a 0 or 1 matrix which represent the connection of roads in the network. In addition, the Time-Delay Estimation (which is optional), denoted as B, may be a matrix with $B_{A \cdot B}{}^i$ as delay term from road_A to road_B with i time unit delay.

According to at least one embodiment, the Impact Matrix may be computed:

$$I=B*T*\Sigma$$

which may be a n*n matrix to represent the road-by-road influence among a road network with n roads within the scope of study. The element $I_{i \rightarrow j}$, for example, is a direct influence from road_i to road_j.

According to at least one embodiment, the traffic congestion detection program may include the analysis of the adjacent influential roads (i.e., first order roads or first level roads). For the object road, the corresponding row (or column) in first order Impact Matrix may show the direct road-by-road influence with other roads in the target road network. The row values in first order Impact Matrix may represent the influence from this road to other roads in the target road network, while the column values in first order Impact Matrix may represent the influence from other roads to the object road in the target road network. The traffic congestion detection program, for example, may indicate that the road_A's (i.e., R_A) corresponding column in the first order Impact Matrix is a vector:

$$I_{\rightarrow A}=(I_{0 \rightarrow A}, I_{1 \rightarrow A}, \ldots, I_{N \rightarrow A})$$

As such, the traffic congestion detection program may consider the adjacent roads for R_A in which the zero values in vector $I_{\rightarrow A}$ may be removed to achieve a non-zero vector:

$$I'_{\rightarrow A}=(I_{0 \rightarrow A}, \ldots, I_{i \rightarrow A}, \ldots)$$

where $I_{i \rightarrow A} \neq 0$ (i=0, 1, ..., N', i≠A), and N' is the number of non-zero values in this vector.

According to at least one embodiment, the traffic congestion detection program may find a main influence group of roads to cover the main traffic influence to road R_A by (1) sorting the impact values in vector $I'_{\rightarrow A}$ in descending order, and denote these values as $I_1, I_2, \ldots, I_{N'}$ without loss of generality, where $I_1$ may be the largest impact value for road R_A, and $I_{N'}$ may be the smallest non-zero impact value; (2) use the largest impact value $I_1$ as the first road in main influence group; and (3) for the largest impact value $I_1$ with the second largest value $I_2$, test if there is a difference between $I_1$ and $I_2$, and compute t statistic and its p-value:

$$t = \frac{I_1 - I_2}{\sqrt{s^2}}$$

$$p = 1 - prob(t\_Value \leq |t|)$$

where $s^2$ is the variance of vector $I'_{\rightarrow A}$, and t_Value is a random variable which follows a t distribution with degree of freedom=N.

If p>0.05, then there is no significant difference between $I_1$ and $I_2$, and $I_2$ is added into the main influence group.

The present embodiment may also include comparing $I_1$ with other smaller impact values, (e.g., $I_1$ with $I_3$, compare with $I_1$ with $I_4$, etc.). The traffic congestion detection program may stop the comparison process until no impact value may be added into a main influence group. The roads in the main influence group may cover the main traffic influence to an object road.

According to at least one embodiment, the traffic congestion detection program may identify significantly influential roads and/or routings by utilizing the z-score method:

1. Compute the median of the impact values in vector $I'_{\rightarrow A}$, denote as $Median_A$;

$$Median_A=median(I_{0 \rightarrow A}, \ldots, I_{i \rightarrow A}, \ldots),$$

where $I_{i \rightarrow A} \neq 0$

2. Compute the median absolute deviation (MAD) for the influence on R_A:

$$MAD_A=median(|I_{0 \rightarrow A}-Median_A|, \ldots, |I_{i \rightarrow A}-Median_A|, \ldots)$$

where $I_{i \rightarrow A} \neq 0$, i=0, 1, ..., N, and i≠A

3. Compute the modified z-score for each adjacent road;

$$z_i = \begin{cases} \frac{I_{i \rightarrow A} - Median_A}{1.4826 \times MAD_A} & \text{if } MAD_A \neq 0 \\ \frac{I_{i \rightarrow A} - Median_A}{1.253315 \times MeanAD_A} & \text{if } MAD_A = 0 \end{cases}$$

where $MeanAD_A = \frac{1}{N'} \sum_{i=1}^{N'} |I_{i \rightarrow A} - Median_A|$ 4. Detect the significantly influential roads:
If $z_i > 3$, the adjacent road i has significant positive impact on road R_A;
If $z_i < -3$, the adjacent road i has significant negative impact on road R_A.

According to at least one embodiment, the traffic congestion detection program may perform an analysis of the indirect influential roads (i.e., second order roads), which are roads that are indirectly connected to each other. For an object road, there may be many second order influential roads, or indirectly connected roads, to the object road. The traffic congestion detection program may first compute a second order Impact Matrix, and then determine the main influence group of second order roads, or the significantly influential second order roads to the object road in the target road network.

According to at least one embodiment, the traffic congestion detection program may pre-estimate the traffic results with the analysis. The "what-if" analysis, for example, may be a method which applies a pre-defined system or model to provide stable outputs with specified inputs. With tuning of inputs, outputs from a pre-defined system or model may be changed to find a more suitable solution based on some criterions. Based on the identified influential road and routing, a traffic management department, or early warning systems, may provide a list of roads or routings for the traffic intervention on a target road. Such a list may significantly reduce the search range of impactful traffic control solution, help to allocate limited resources to focus on more significant traffic factors, and the intervening results may be quantified for easy decision making.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a traffic congestion detection program 110a. The networked computer environment 100 may also include a server 112 that is enabled to run a traffic congestion detection program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the traffic congestion detection program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the traffic congestion detection program 110a, 110b (respectively) to detect a plurality of influential factors for traffic congestion. The traffic congestion detection method is explained in more detail below with respect to FIG. 2.

Figure 2:
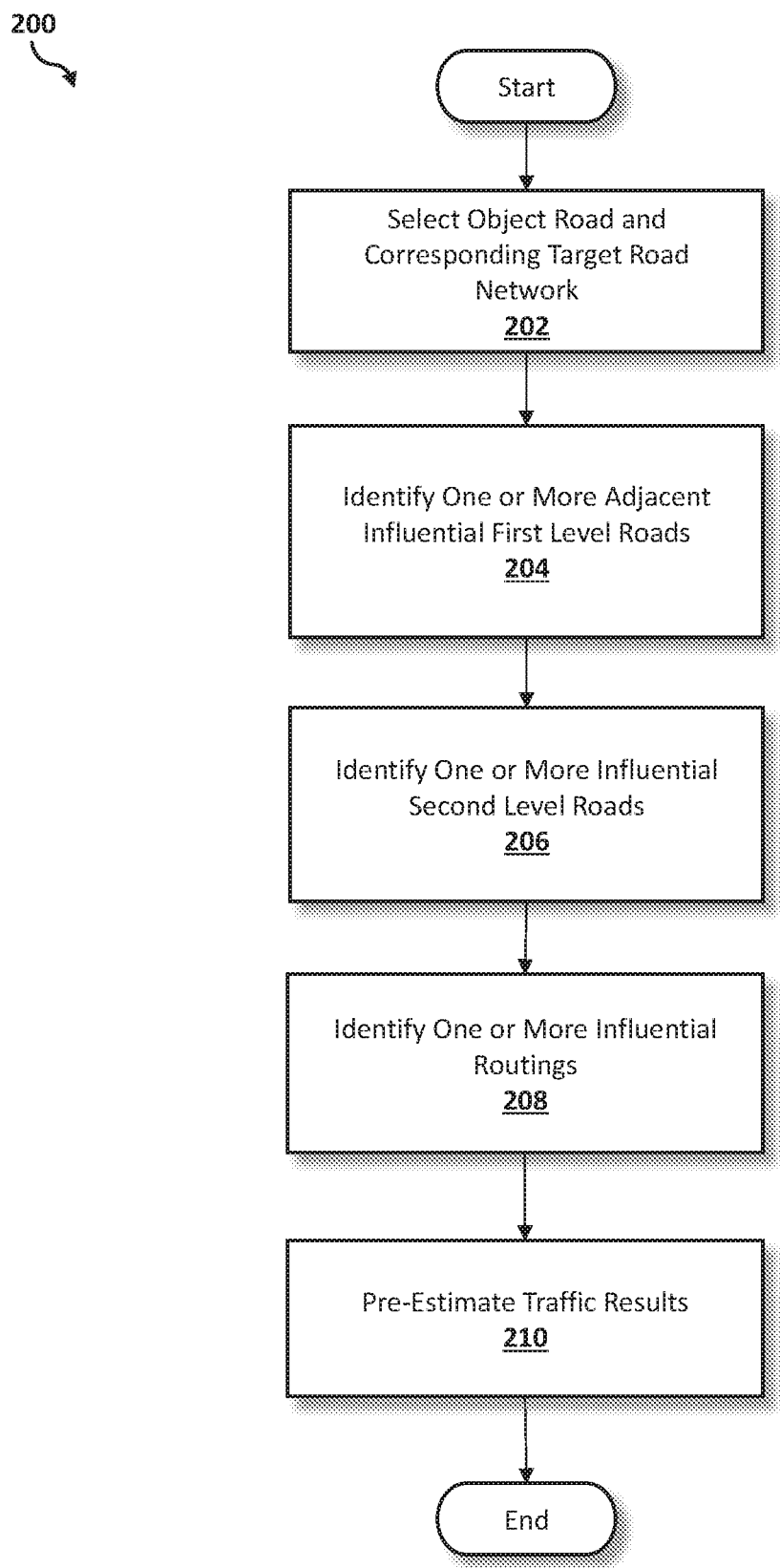
FIG. 2 is an operational flowchart illustrating a process for detecting traffic congestion according to at least one embodiment.

Referring now to FIG. 2, an operational flowchart illustrating the exemplary traffic congestion detection process 200 used by the traffic congestion detection program 110a, 110b according to at least one embodiment is depicted.

At 202, the object road and corresponding target road network are selected. Using a software program 108 on the user's device (e.g., user's computer 102), the traffic congestion detection program 110a, 110b may receive as input the object road and corresponding target area (i.e., the object road is located within the target area or target road network) via communication network 116. The target road network (or target area) may be a geographic area or region in which the object road (or portion of the object road to be evaluated by the traffic congestion detection program 110a, 110b) is located. The target area may be selected by either an external software program 108, or by a user.

In one embodiment, the traffic congestion detection program 110a, 110b may utilize an external software program 108 to select the object road and corresponding target road network for the traffic congestion detection program 110a, 110b to detect influential roads and/or routings for designated traffic congestion and to measure the impact of these roads and/or routings for further traffic control. The object road and target road network may be selected based on the frequency of traffic on that specific road, the number of traffic related accidents, and the number of pedestrian complaints and complaints from vehicle drivers and occupants (i.e., vehicle complaints) associated with the object road (e.g., pedestrian and vehicle complaints gathered, categorized and handled based on local applicable laws and statutes in that jurisdiction).

In another embodiment, the traffic congestion detection program 110a, 110b may utilize an external software program 108 to randomly select the object road and target road network to detect influential roads and/or routings for designated traffic congestion and to measure the impact of these roads and/or routings for further traffic control. The random selection process may be utilized to ensure that traffic results for a vast majority of influential roads and/or routings associated with a vast amount of road networks and roads, regardless of the traffic situation, are detected and the impact of the influential roads and/or routings are measured for further traffic control.

In at least one embodiment, a user (e.g., a person associated with a traffic management department) may manually select the object road and target road network based on a particular traffic study, personal observations or knowledge, or in preparation for construction or traffic pattern changes within the object road and target road network.

After the object road and corresponding target road network are selected, any maps or geographical information associated with the target road network may be uploaded or fed into the traffic congestion detection program 110a, 110b. The maps or geographical information may be uploaded from social media, websites, various form of digital media, or from information stored in a map database (e.g., database 114) that the traffic congestion detection program 110a, 110b may query to retrieve applicable geographical information or maps of the target road network associated with the object road.

In at least one embodiment, the traffic congestion detection program 110a, 110b may also receive as input data associated with the recent traffic patterns on the object road and corresponding target road network via the communications network 116. The received data may be uploaded or fed into the traffic congestion detection program 110a, 110b to compute the Impact Matrix associated with the object road, as well as identify the influential roads (e.g., boulevards, avenues or roads that are directly connected to the object road) and influential routings (e.g., boulevards, avenues or roads that are indirectly connected to the object road) associated with the object road.

For example, the local traffic authority agency decides to evaluate the traffic patterns on Main Street due to the recent surge in traffic-related accidents in the city square. As such, a statistician for the traffic authority agency inputs Main Street as the object road into the traffic congestion detection program 110a, 110b, and selects the road network around the city square as the target road network. Upon receiving the target road network and object road, the traffic congestion detection program 110a, 110b uploads a series of maps (including traffic maps, topological maps) from the Internet into the traffic congestion detection program 110a, 110b.

Next, at 204, one or more adjacent influential first level roads are identified. For a given object road, the traffic congestion detection program 110a, 110b may identify the influential first level roads (i.e., first order roads), which may be adjacent to the object road. For two given roads, if the two roads are directly connected with each other, then these two given roads may be considered directly connected roads, and therefore, adjacent influential first level roads. For example, two given roads (R_A and R_B), R_A and R_B are directly connected to each other. As such, R_B is considered an influential first level road to R_A (object road).

The traffic congestion detection program 110a, 110b may first compute the first order Impact Matrix. The traffic congestion detection program 110a, 110b may utilize the Impact Matrix to provide the road-by-road influence (i.e., determine how each road within a road network may influence each other and any other adjacent or surrounding roads) among a road network, within the target road network. The traffic congestion detection program 110a, 110b may utilize several sources of information to compute the Impact Matrix, including spatial correlation, network topology and time-delay estimation.

The data associated with the object road may be measured to compute the first order Impact Matrix, assuming the following model:

$$I = B * T * \Sigma$$

where I denotes Impact Matrix, B denotes a time-delay estimation in which a matrix with $B_{A \cdot B}{}^i$ as delay term from road_A to road_B with i time unit delay, T or T[A,B] denotes a network topology structure in which 0 or 1 matrix represents the connection of the roads (i.e., road_A and road_B), and $\Sigma$ denotes a spatial correlation (i.e., dependency).

The spatial correlation (i.e., dependence) between road_A and road_B may be calculated, as one element of the spatial correlation matrix, assuming the following model:

$$\Sigma = \text{spacial\_corr}(A,B)$$

where A denotes road_A and B denotes road_B. The above model, $\Sigma$=spacial_corr(A,B), denotes one element of the spatial correlation matrix.

Since the spatial correlation coefficient may include a range from −1 to 1, a high spatial correlation of an absolute value larger than 0.6 may denote that the traffic status of the two roads (i.e., road_A and road_B) have a statistically stronger relation with each other. A low spatial correlation of an absolute value smaller than 0.2 may represent that the traffic status of the two roads are not dependent (i.e., independent) of each other. In another embodiment, an administrator may alter or change the threshold level of high or low spatial correlation based on the specific preferences or circumstances associated with the scope of study.

The traffic congestion detection program 110a, 110b may then combine the data associated with the spatial correlation, network topology and time-delay estimation (i.e., available sources of information) to compute the first order Impact Matrix, which may describe the first order of influence and diffusion of traffic status among the road network, assuming the following model:

$$I = \text{from:} \begin{array}{c} \\ R0 \\ R1 \\ R2 \\ R3 \\ R4 \\ \ldots \end{array} \begin{array}{c} \text{to:} \\ \begin{array}{ccc} R0 & R1 & \ldots \\ I_{0 \to 0} & \ldots & \ldots \\ I_{1 \to 0} & \ldots & \ldots \\ I_{2 \to 0} & \ldots & \ldots \\ I_{3 \to 0} & \ldots & \ldots \\ I_{4 \to 0} & \ldots & \ldots \\ \ldots & \ldots & \ldots \end{array} \end{array} = \begin{bmatrix} 1 & \ldots & \ldots \\ 0.3 & \ldots & \ldots \\ 0.6 & \ldots & \ldots \\ 0.5 & \ldots & \ldots \\ 0.8 & \ldots & \ldots \\ \ldots & \ldots & \ldots \end{bmatrix}$$

where the elements in the first row may represent the direct influence from road_0, road_1, road_2, . . . to road_0.

In another embodiment, the traffic congestion detection program 110a, 110b may utilize several existing methods to provide a spatial correlation matrix, such SPSS 'Spatial Temporal Prediction' Model, and alternate spatial analysis methods (e.g., spatial autocorrelation, spatial regression).

Additionally, for the given object road, the row values in the first order Impact Matrix computed by the traffic congestion detection program 110a, 110b may represent the influence from the object road to other roads in the road network, while the column values in the Impact Matrix may represent the influence from other roads to the object road in the road network. For example, the object road, road_A, corresponding column in the first order Impact Matrix is a vector, assuming the following model:

$$I_{\to A} = (I_{0 \to A}, I_{1 \to A}, \ldots, I_{N \to A})$$

where if only the adjacent roads to road_A are considered, the zero values in the vector may be removed to obtain a non-zero vector, assuming the following model:

$$I'_{\to A} = (I_{0 \to A}, \ldots, I_{i \to A}, \ldots)$$

where $I_{i \to A} \neq 0$ (i=0, 1, . . . , N', i≠A), and N' is the number of non-zero values in this vector.

The traffic congestion detection program 110a, 110b may then utilize one or more statistical tests to detect the adjacent influential first order roads for the object road. In one embodiment, the influential first order roads may be determined based on the top number (N) of most influential roads (i.e., the main influence group). The traffic congestion detection program 110a, 110b may utilize one or more statistical tests to identify a group of roads to cover main traffic influence for the object road with traffic congestion. The one or more statistical tests utilized to identify the top number of most influential roads, assumes the following steps:

1. Sort the impact values in vector $I'_{\to A}$ in descending order, and denote these values as $I_1, I_2, \ldots, I_{N'}$ without loss of generality. $I_1$ is the largest impact value for the object road, and $I_{N'}$ is the smallest non-zero impact value.
2. Use the largest impact value $I_1$ as the first road in the main influence group.
3. For the largest impact value $I_1$ with the second largest value $I_2$, test if there is a difference between $I_1$ and $I_2$. Compute t statistic and its p-value:

$$t = \frac{I_1 - I_2}{\sqrt{s^2}}$$

$$p = 1 - prob(\text{t\_Value} \le |t|)$$

where $s^2$ is the variance of vector $I'_{\cdot \to A}$, and t_Value is a random variable which follows a t distribution with degree of freedom=N.

p>0.05, then there is no significant difference between $I_1$ and $I_2$, and $I_2$ is added into the main influence group.

4. Repeat previous step to compare $I_1$ with other smaller impact values, say compare $I_1$ with $I_3$, compare $I_1$ with $I_4$, and so on. The statistical test may continue and repeat steps 1-4 when the impact value may be added into the main influence group; however, if an impact value is reached in which the difference between $I_1$ and the smaller impact value is a significant difference (e.g., p≤0.05), then the statistical test may conclude and that smaller impact value and any smaller impact value remaining (i.e., any impact value that is smaller than the first impact value in which a significant difference was determined) may not be added into the main influence group; and 5. The roads in the main influence group may include the main traffic influence to the object road.

Additionally, in the main influence group, the traffic congestion detection program 110a, 110b may utilize p=0.05 as the default threshold for determining whether a first order road is a part of the main influence group associated with the object road. As such, any p greater than 0.05 may denote no significance between the impact values, and therefore, the road associated with the smaller of the two compared impact values may be included in the main influence group. In another embodiment, an administrator may alter or change the threshold level based on the specific preferences or circumstances associated with the scope of study.

In another embodiment, the influential first order roads may be determined based on the significantly influential roads. The traffic congestion detection program 110a, 110b may utilize one or more statistical tests to detect roads which significantly influence the congested object road. One of such statistical tests to identify the significantly influential road, z-score method, assumes the following steps:

1. Compute the median of the impact values in vector $I'_{\cdot \to A}$, denotes as $\text{Median}_A$ $$\text{Median}_A = \text{median}(I_{0 \to A}, \ldots, I_{i \to A}, \ldots)$$

where $I_{i \to A} \ne 0$

2. Compute the median absolute deviation (MAD) for the influence on the object road (R_A)

$$MAD_A = \text{median}(|I_{0 \to A} - \text{Median}_A|, \ldots, |I_{i \to A} - \text{Median}_A|, \ldots)$$

where $I_{i \to A} \ne 0$, i=0, 1, ..., N, and i≠A

3. Compute the modified z-score for each adjacent road $$z_i = \begin{cases} \dfrac{I_{i \to A} - \text{Median}_A}{1.4826 \times MAD_A} & \text{if } MAD_A \ne 0 \\ \dfrac{I_{i \to A} - \text{Median}_A}{1.253315 \times MeanAD_A} & \text{if } MAD_A = 0 \end{cases}$$

where $MeanAD_A = \dfrac{1}{N'} \sum_{i=1}^{N'} |I_{i \to A} - \text{Median}_A|$ 4. Identify the significantly influential roads:
   If $z_i > 3$, the adjacent road i has significant positive impact on road R_A;
   If $z_i < -3$, the adjacent road i has significant negative impact on road R_A.

Additionally, for significant influence, the traffic congestion detection program 110a, 110b may utilize $z_i = 3$ as the default threshold for determining whether a first order road significantly influences the object road. As such, any $z_i$ greater than 3 may denote a positive impact on the object road, and any $z_i$ less than −3 signifies a negative impact on the road. Regardless of whether the road has a positive or negative impact on the object road, each impact may be considered as a significant influence on the object road. As such, any $z_i$ between 3 and −3 may be considered to have a minimal or no impact on the object road, and therefore may not be considered to significantly influence the object road. In another embodiment, an administrator may alter or change the threshold level based on the specific preferences or circumstances associated with the scope of study.

Continuing the previous example, the traffic congestion detection program 110a, 110b computes the first order Impact Matrix based on the data associated with the connection of the roads, the estimated time-delay of traffic on Main Street at various intersections with adjacent roads, and the traffic status of Main Street with several other adjacent roads to determine whether the traffic patterns of each adjacent road are correlated with Main Street. Based on the data generated, the traffic congestion detection program 110a, 110b finds several adjacent first order roads, including First Street, Second Street, Fig Avenue, Plum Olive Boulevard and Third Place. Each of these influential roads intersect with Main Street. The traffic congestion detection program 110a, 110b then performs the z-score method to determine the significantly influential roads. In comparing the adjacent influential roads, the following significant impact values were computed for each:

First Street=4
Second Street=3.7
Fig Avenue=−3.69
Plum Olive Boulevard=−2.8
Third Place=−0.9

Since only First Street, Second Street and Fig Avenue satisfy the threshold level of the traffic congestion detection program 110a, 110b with a positive impact value of greater than 3 or a negative impact value of less than −3, First Street, Second Street and Fig Avenue are considered significantly influential first order roads to the object road, Main Street.

Then, at 206, one or more influential second level roads are identified. For a given object road, the traffic congestion detection program 110a, 110b may identify the influential second level roads (i.e., second order roads), which may be indirectly connected to the object road. For two given roads, if the two roads are not directly connected with each other and instead each road is related to a common road, then these two given roads may be considered indirectly connected roads, and therefore, second level adjacent influential roads. For example, for two given roads (R_A and R_C), R_A and R_C are not directly connected to each other. However, since R_A connects to R_B and R_C connects to R_B, R_A and R_C are indirectly connected roads with two jumps from R_A and R_C. As such, R_C is considered a second order influential road to R_A (object road).

The traffic congestion detection program 110a, 110b may first compute the second order Impact Matrix for the second order object road, assuming the following model:

$$I^2 = \begin{bmatrix} I_{0\to 0} & \cdots & I_{0\to n} \\ \vdots & \ddots & \vdots \\ I_{n\to 0} & \cdots & I_{n\to n} \end{bmatrix} \begin{bmatrix} I_{0\to 0} & \cdots & I_{0\to n} \\ \vdots & \ddots & \vdots \\ I_{n\to 0} & \cdots & I_{n\to n} \end{bmatrix}$$

where element $I_{0\to n}^2$ denotes an indirect influence from road_0 to road_n.

In one embodiment, the traffic congestion detection program 110a, 110b may compute a different Impact Matrix (i.e., second order Impact Matrix) from the first order Impact Matrix to describe the second order influence and diffusion of traffic status among the target road network. In another embodiment, the traffic congestion detection program 110a, 110b may utilize the same Impact Matrix to compute the influential second order roads for the object road, as the first order Impact Matrix utilized to compute the influential first order roads for the object road.

Then, the traffic congestion detection program 110a, 110b may identify the influential second order roads associated with the object road.

In one embodiment, the traffic congestion detection program 110a, 110b may identify the influential second order roads by determining the main traffic influence to the object road. The traffic congestion detection program 110a, 110b may utilize the same one or more statistical tests to identify a group of influential second order roads to determine main traffic influence for the object road with traffic congestion, as previously utilized by the traffic congestion detection program 110a, 110b to determine the main influence group of first order roads.

In another embodiment, the traffic congestion detection program 110a, 110b may identify one or more significantly influential second order roads to the object road. The traffic congestion detection program 110a, 110b may utilize the same one or more statistical tests to detect roads which significantly influence the congested object road, as previously utilized by the traffic congestion detection program 110a, 110b to determine the significantly influential first order roads.

Continuing the previous example, the traffic congestion detection program 110a, 110b computes the second order Impact Matrix based on the data associated with the connection of the roads, the estimated time-delay of traffic on Main Street with various roads indirectly connected to Main Street, and the traffic status of Main Street with several other indirectly connected roads to determine whether the traffic patterns of each indirectly connected road are correlated with Main Street. Based on the data generated, the traffic congestion detection program 110a, 110b finds several second order roads, including Orange Street, Tomato Street, Fourth Avenue, Richmond Tree Boulevard and Agave Nectar Place. Each of these influential roads are connected to roads that Main Street is connected to. Orange Street is connected to First Street, Tomato Street is connected to Second Street, Fourth Avenue is connected to Fig Avenue, Richmond Tree Boulevard is connected to Plum Olive Boulevard, and Agave Nectar Place is connected to Third Place. The traffic congestion detection program 110a, 110b then performs the z-score method to determine the significantly influential second order roads. In comparing the indirectly connected roads, the following significant impact values were computed for each:

Orange Street (connected to First Street)=5
Tomato Street (connected to Second Street)=−0.9
Fourth Avenue (connected to Fig Avenue)=−2.9
Richmond Tree Boulevard (connected to Plum Olive Boulevard)=−3.9
Agave Nectar Place (connected to Third Place)=−1.89

Since only Orange Street and Richmond Tree Boulevard satisfy the threshold level of the traffic congestion detection program 110a, 110b with a positive impact value of greater than 3, or a negative impact of less than −3, Orange Street and Richmond Tree Boulevard are considered significantly influential second order roads to the object road, Main Street.

Then, at 208, one or more influential routings are identified. The traffic congestion detection program 110a, 110b may then identify one or more influential routings to the second order object road. An influential routing may be one or more routes that may include multiple roads, as well as the object road. The traffic congestion detection program 110a, 110b may identify the one or more influential routings, assuming the following exemplary model:

$$I_{10\to 0}^2 = I_{10\to 3} \cdot I_{3\to 0} + I_{10\to 4} \cdot I_{4\to 0} + \cdots$$

where R10 is influential routing to R0.

The inputs for the traffic congestion detection program 110a, 110b may include the impact values of each adjacent road, $I_{i\to A}$. Based on the above exemplary model, the impact values of each routing may be, for example, $I_{10\to i} \cdot I_{i\to 0}$. When computing the second order Impact Matrix, during the matrix multiplication, the impact value for each possible routing may be calculated, $I_{10\to 3} \cdot I_{3\to 0}$, and the impact value for routing: road_10→road_3→road_0, and $I_{10\to 4} \cdot I_{4\to 0}$ may be the impact value for routing: road_10→road_4→road_0, etc.

For example, R_A connects to R_B and R_C connects to R_B. From R_A to R_C there are several routings, and R_A→A_B→R_C, which may be denoted as Routing$_{ABC}$. Then impact value of Routing$_{ABC}$ may be computed with the Impact Matrix computation, as $I_{A\to B} \cdot I_{B\to C}$, where $I_{A\to B}$ and $I_{B\to C}$ may be the elements of first order Impact Matrix.

In one embodiment, the traffic congestion detection program 110a, 110b may identify the influential routings by determining the main traffic influence or top (N) number of influential routings to the object road. The traffic congestion detection program 110a, 110b may utilize the same one or more statistical tests to identify a group of roads to determine main traffic influential routings for the object road with traffic congestion, as previously utilized by the traffic congestion detection program 110a, 110b to determine the main influential roads.

In another embodiment, the traffic congestion detection program 110a, 110b may identify one or more significantly influential routings to the object road. The traffic congestion detection program 110a, 110b may utilize the same one or more statistical tests to identify routings, which significantly influence the object road, as previously utilized by the traffic congestion detection program 110a, 110b to determine the significantly influential roads.

Continuing the previous example, based on the information generated on the significantly influential first order and second order roads, the traffic congestion detection program 110a, 110b determines the significantly influential routings are Orange Street→First Street→Main Street, and Richmond Tree Boulevard→Plum Olive Boulevard→Main Street. The traffic congestion detection program 110a, 110b then performs the z-score method to determine the significantly influential routings. In comparing the influential routings, the following significant impact values were computed for each:

Orange Street→First Street→Main Street=7

Richmond Tree Boulevard→Plum Olive Boulevard-→Main Street=−6.8

Since both Orange Street→First Street→Main Street, and Richmond Tree Boulevard→Plum Olive Boulevard→Main Street satisfy the threshold level of the traffic congestion detection program 110a, 110b with a positive impact value of greater than 3, or a negative impact of less than −3, Orange Street→First Street→Main Street, and Richmond Tree Boulevard=Plum Olive Boulevard→Main Street are considered significantly influential routings.

Then, at 210, the traffic results are pre-estimated. To pre-estimate the traffic results associated with the object road, the traffic congestion detection program 110a, 110b may perform an analysis (e.g., "what-if" analysis) by an external pre-defined system or model to provide stable outputs with specified inputs. The traffic congestion detection program 110a, 110b may upload or feed, via communication network 116, into the external pre-defined system or model, the information generated by the traffic congestion detection program 110a, 110b (e.g., a list of influential routings, second order roads and first order roads associated with the object road, impact values associated with each, and a guideline to execute the pre-estimation of the traffic results) as input. The traffic congestion detection program 110a, 110b may further guide the external pre-defined system or model to analyze the influential roads (including first order and second order influential roads) and influential routings, and roads and routings with the highest impact values first. The external pre-defined system or model may then analyze the impact values and information provided by the traffic congestion detection program 110a, 110b to determine whether the influential routings or roads may differ if influential factors change (e.g., time of day, day of the week, weather conditions).

By tuning the inputs, outputs from the external pre-defined system or model may be changed according to a more suitable solution based on certain criterions as determined by the external pre-defined system or model. For example, if the town experiences high traffic congestion during rush hour and certain roads are under temporary construction, then the external pre-defined system or model may be changed to avoid these roads under temporary construction, specifically during rush hour. Therefore, the embodiment may improve the pre-estimated traffic results for the town during rush hour and while certain roads are under temporary construction.

In one embodiment, the traffic congestion detection program 110a, 110b may utilize an external pre-defined system or model to perform a "what-if" analysis. The "what-if" analysis may include changing the impact values to observe how the changes may affect the outcome of influential routings to the object roads.

In one embodiment, the user or a traffic management department may utilize the pre-estimated traffic results generated by the traffic congestion detection program 110a, 110b to manually generate a list of one or more influential roads and one or more influential routings for traffic intervention on the object road.

In another embodiment, the traffic congestion detection program 110a, 110b may automatically generate a list of one or more influential roads and one or more influential routings for traffic intervention on the object road based on the pre-estimated traffic results. The generated list may then be presented to the user or a traffic management department to assist with determining traffic intervention for an object road. The generated list, for example, may reduce the search range of impactful traffic control solutions, help to allocate limited resources to focus on more significant traffic factors (i.e., influential factors), and the intervening results are quantified for easy decision making.

Continuing the previous example, the traffic congestion detection program 110a, 110b uploaded the following information calculated by the traffic congestion detection program 110a, 110b:

Orange Street→First Street→Main Street=7
Richmond Tree Boulevard→Plum Olive Boulevard-→Main Street=−6.8
Orange Street (connected to First Street)=5
Richmond Tree Boulevard (connected to Plum Olive Boulevard)=−3.9
First Street=4
Second Street=3.7
Fig Avenue=−3.69

The traffic congestion detection program 110a, 110b then guides the external pre-defined system to first analyze the influential routings, then the influential first order and second order roads associated with Main Street. Based on the impact values provided, the external pre-defined system then determines if there are any differences between the influential routings and roads if influential factors are changed, such as, if the time of day, day of the week, weather conditions, or construction schedule changes. Based on this "what-if" analysis, the external pre-defined system determines whether the ranked list of significantly influential roads and routings change.

In the present embodiment, the traffic congestion detection program 110a, 110b may detect influential factors for traffic congestion based on the change in the influence of road(s) or routing(s) to the traffic congestion associated with the object road, Main Street. For example, if Fig Avenue was a significantly influential second order road in the past with a positive impact to traffic congestion on Main Street, and recently temporary construction on Fig Avenue and an adjacent road Apricot Street has negatively influenced traffic congestion on Main Street (or caused the traffic on Fig Avenue to have no impact or influence on Main Street), then the temporary construction on Fig Avenue may be considered an influential factor for traffic congestion on Main Street, if the temporary construction is the only change to Fig Avenue. If there are additional changes to Fig Avenue since the change in Fig Avenue's impact value, then the traffic congestion detection program 110a, 110b may detect these additional changes and determine whether the additional changes are influential factors for traffic congestion. For example, if the temporary construction periodically occurred once every two months with no change to traffic congestion on Fig Avenue, then the traffic congestion detection program 110a, 110b may not consider that type of temporary construction as an influential factor for traffic congestion on Main Street.

In the present embodiment, the traffic congestion detection program 110a, 110b may store the pre-estimate results and/or the generated list of one or more influential roads (including the influential first order roads and the influential second order roads) and one or more influential routings in a results database (e.g., database 114). As such, the pre-estimated results and generated list may be available for visualization or searching by the user (e.g., person associated with the traffic management department, or member of the public if available for public access). An administrator associated with the traffic congestion detection program 110a, 110b may configure the results database to limit the storage capability, the length of time that the pre-estimated traffic results and/or the generated list may remain on the results database, and the type of traffic results and/or generated lists that may be stored on the results database.

In the present embodiment, the traffic congestion detection program 110a, 110b may re-evaluate the validity of previously determined pre-estimated traffic results. In one embodiment, the traffic congestion detection program 110a, 110b may be automatically triggered by an external software program 108, when there is at least one significant change in the traffic patterns (i.e., any change that may alter the traffic patterns associated with influential roads or routings, or affect traffic congestion in a target road network or road), or a change in the elements of the Impact Matrix (including first order Impact Matrix or second order Impact Matrix). Such an automated trigger mechanism may cause the traffic congestion detection program 110a, 110b to repeat the traffic congestion detection process 200, starting at 202, on the object road associated with the significant change in the traffic pattern.

In another embodiment, the user may manually select the target road network, where there was a change in the influential roads and/or routings, or overall traffic patterns, to repeat the traffic congestion detection process 200 starting at 202.

In another embodiment, the traffic congestion detection program 110a, 110b may be configured, by the administrator, to periodically re-evaluate the previously determined pre-estimated traffic results of the previous target road networks. As such, the traffic congestion detection program 110a, 110b may automatically re-evaluate the previously determined pre-estimated traffic results.

In the present embodiment, the traffic congestion detection program 110a, 110b may replace the previously determined pre-estimated traffic results with the new pre-estimated traffic results, and store the new pre-estimated results after the re-evaluation of the previously determined pre-estimated traffic results. In another embodiment, the traffic congestion detection program 110a, 110b may add the new pre-estimated traffic results, with indication as to the reason for the new pre-estimated traffic results (e.g., due to temporary construction on road_A that is scheduled to last for six months). As such, when a user reviews the traffic results for that target road network, the user may review a history of traffic results associated with the target road network to determine a change in the traffic patterns. In at least one embodiment, the reason for the new pre-estimated traffic results may be utilized to determine when to perform another evaluation of the pre-estimated traffic results in that target road network.

In at least one embodiment, the traffic congestion detection program 110a, 110b may allow user feedback on the detection of influential roads and/or routings, and the quantization of impact of the influential roads and/or routings on the object road in the target road network. The user may select the "User Feedback" button located at the bottom of the main screen to provide such user feedback. Once the "User Feedback" button is selected, then the user may be prompted (e.g., via dialog box) to provide, in a comment box, the object road and corresponding target road network that the user feedback is associated with, and click the "Submit" button located at the bottom of the dialog box. After the user provides the object road and corresponding target road network, the dialog box, for example, may expand and the user may be prompted to provide feedback (e.g., Tomato Street is an influential first order road, Agave Nectar Place is a significantly influential second order street, or Agave Nectar Place has been renamed to Avocado Drive). Then, the user may select the "Submit" button located at the bottom of the dialog box. The traffic congestion detection program 110a, 110b may automatically review the provided user feedback, as well as any corresponding data, maps, geographic information, pre-estimated traffic results and impact values associated with the user feedback to determine whether the pre-estimated traffic results may be re-evaluated or modified due to the user feedback.

The functionality of a computer may be improved by the traffic congestion detection program 110a, 110b because the traffic congestion detection program 110a, 110b identifies one or more influential roads and/or routings associated with the object road by utilizing one or more statistical detection methods, and quantifies the impact of the one or more influential roads and/or routings associated with the object road to prioritize traffic resource allocation. The traffic congestion detection program 110a, 110b may further improve the functionality of the computer by improving simulation performance to assist traffic control and resource allocation.

Additionally, the traffic congestion detection program 110a, 110b may be considered a systematic method of identifying which roads and routings may be the most relevant for a specified road section (i.e., target road network), and measuring the impact for those influential factors that affect the traffic. The traffic congestion detection program 110a, 110b may provide guideline to execute an external pre-defined system or model that may perform, for example, a "what-if" analysis for real road network traffic simulations to control "what" (i.e., traffic) by changing "if" (i.e., influential factors). The "what-if" analysis may generate pre-estimated traffic results that may be utilized and applied to other roads in the target road network by the traffic congestion detection program 110a, 110b to improve the traffic patterns in the target road network. The pre-estimated traffic results generated by the traffic congestion detection program 110a, 110b may be deployed for traffic management and early-warning systems in real-time and automatically, prioritize traffic resource allocation, and serve as a concrete and valuable tool for traffic management to ease congestion.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
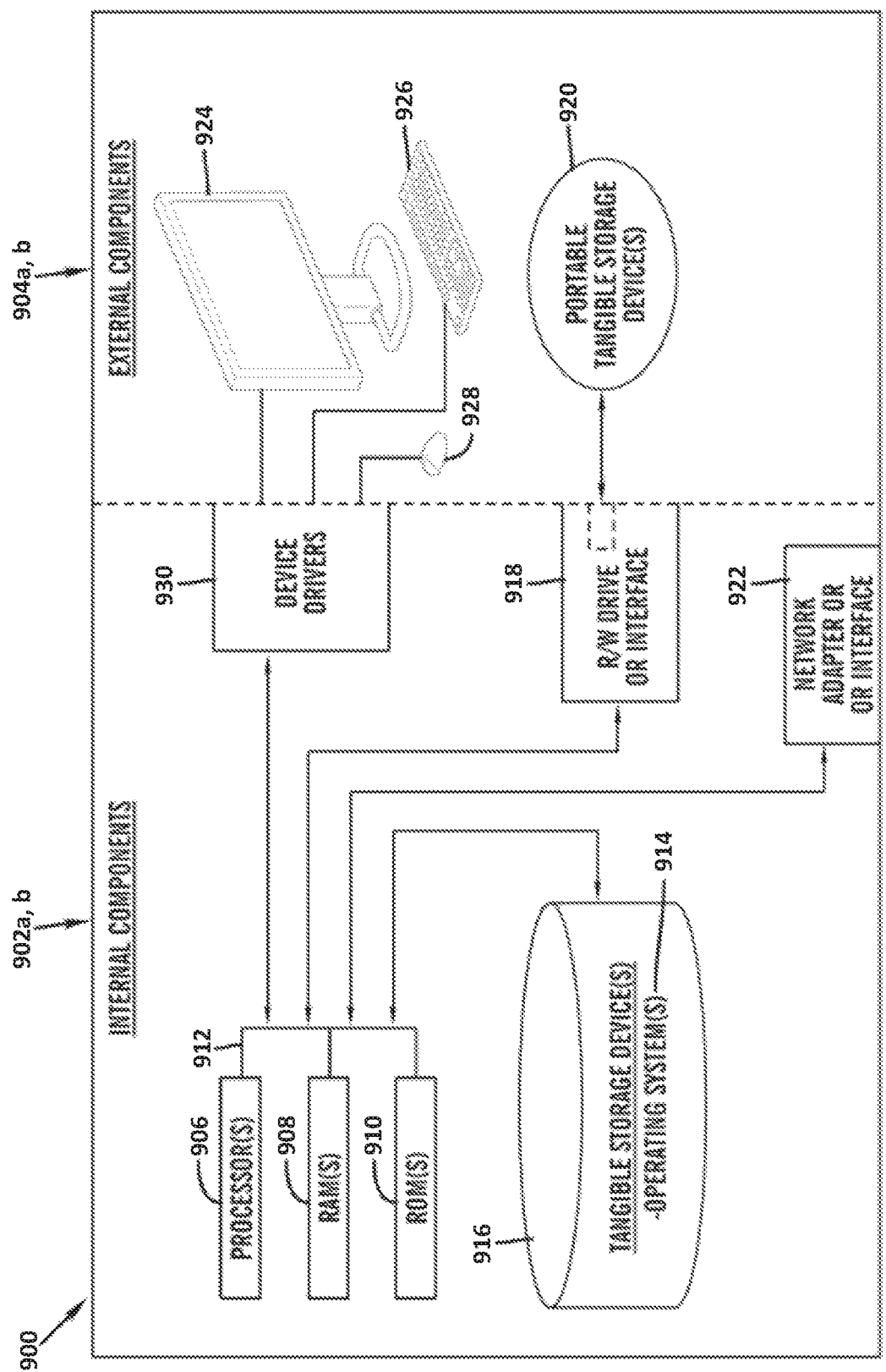
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the traffic congestion detection program 110a in client computer 102, and the traffic congestion detection program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the traffic congestion detection program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the traffic congestion detection program 110a in client computer 102 and the traffic congestion detection program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the traffic congestion detection program 110a in client computer 102 and the traffic congestion detection program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
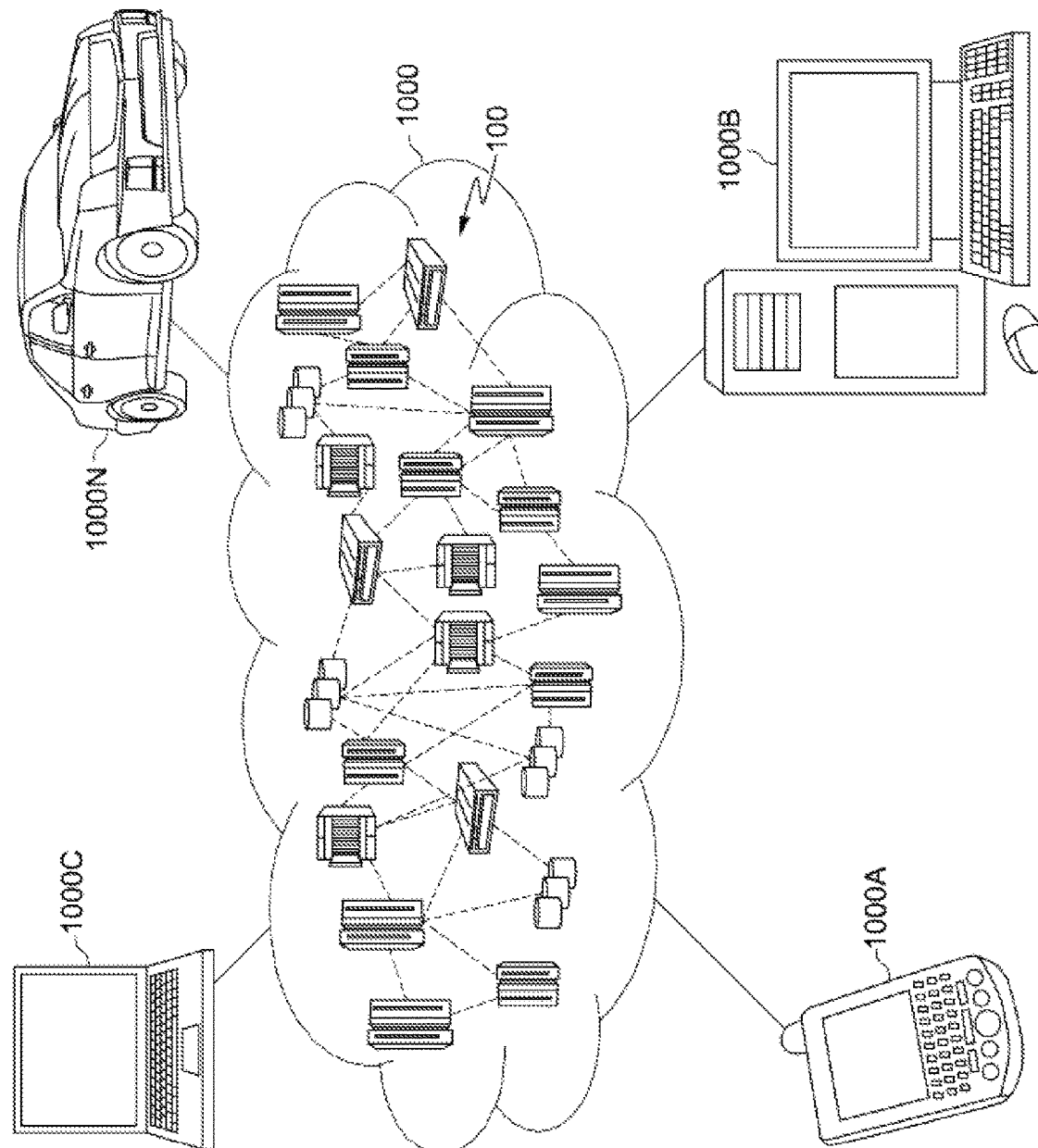
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
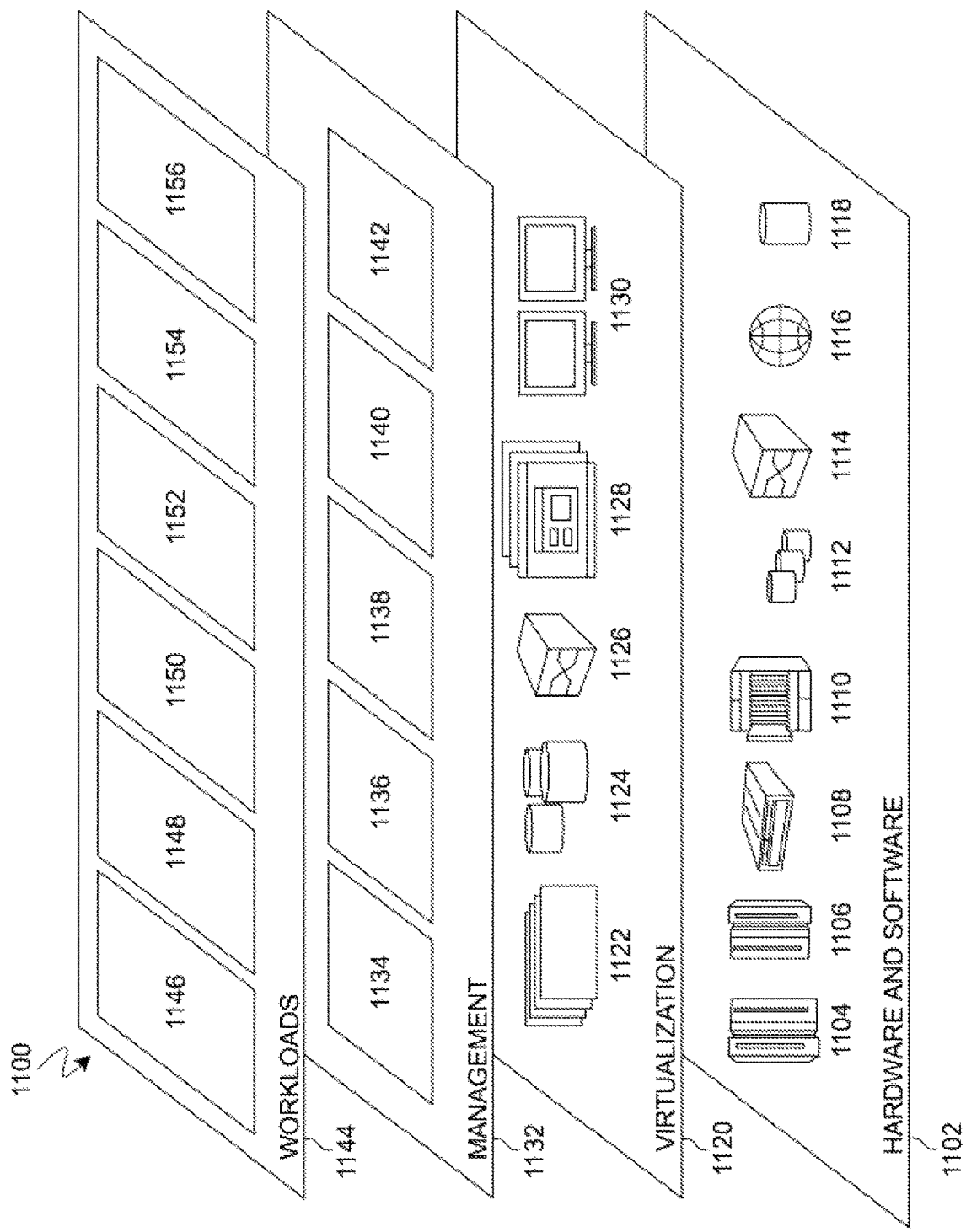
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; ISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and traffic congestion detection 1156. A traffic congestion detection program 110a, 110b provides a way to detect a plurality of influential factors for traffic congestion.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting a plurality of influential factors for traffic congestion, the method comprising:

receiving as input an object road and a corresponding target road network via a communication network, wherein an impact of the influential factors affecting the object road and the target road network is measured and analyzed for further traffic control analysis;

identifying one or more influential roads and one or more influential routings associated with the object road in the target road network;

quantifying the impact associated with the identified one or more influential roads and the identified one or more influential routings associated with the object road that affect traffic on the object road, wherein at least one Impact Matrix is utilized to determine a road-by-road influence in connection to the target road network;

providing, to an external pre-defined system, a list of the identified one or more influential roads and the identified one or more influential routings associated with the object road with a plurality of impact values associated with each of the identified one or more influential roads and a plurality of impact values associated with each of the identified one or more influential routings;

analyzing the provided list based on the plurality of influential factors, wherein a guideline is provided to the external pre-defined system to analyze the provided list, wherein the guideline guides the external pre-defined system to analyze the one or more influential roads and the one or more influential routings with the highest impact values first; and generating a plurality of pre-estimate traffic results, wherein generating the plurality of pre-estimate traffic results includes executing a set of rules comprising:
utilizing the external pre-defined system to perform a what-if analysis, wherein the what-if analysis changes the plurality of impact values;
determining whether the changes in the plurality of impact values affect the one or more influential roads and/or the one or more influential routings associated with the object road; and
in response to determining the changes in the plurality of impact values affect the one or more influential roads and/or the one or more influential routings associated with the object road, identifying the influential factors that caused the one or more influential roads and/or the one or more influential routings associated with the object road to change.

2. The method of claim 1, wherein identifying the one or more influential roads and the one or more influential routings associated with the object road in the target road network, further comprises:
computing the at least one Impact Matrix,
wherein a first order Impact Matrix is associated with the one or more first order influential roads associated with the object road,
wherein a second order Impact Matrix is associated with the one or more second order influential roads associated with the object road; and
identifying the one or more influential roads and the one or more influential routings associated with the object road by utilizing one or more statistical detection methods,
wherein the one or more first order influential roads associated with the object road is identified, wherein the one or more second order influential roads associated with the object road is identified,
wherein the one or more influential routings associated with the object road is identified.

3. The method of claim 2 in which the computed Impact Matrix is calculated by combining a spatial correlation matrix and a network topology structure.

4. The method of claim 2, wherein quantifying the impact associated with the identified one or more influential roads and the identified one or more influential routings associated with the object road, further comprises:
determining at least one main influential group of first order roads associated with the object road by utilizing one or more statistical tests, wherein determining the at least one main influential group of first order roads comprises:
computing a plurality of impact values in a vector by the Impact Matrix,
sorting the computed plurality of impact values in descending order,
identifying a largest impact value from the sorted plurality of impact values,
comparing the identified largest impact value with a second largest impact value from the sorted plurality of impact values,
computing a quantified difference between the compared largest impact value and the compared second largest impact value, and
comparing the computed quantitative difference to a threshold value to determine whether there is a significant difference between the compared largest impact value and the compared second largest impact value.

5. The method of claim 4, further comprising:
in determining that three or more impact values from the plurality of impact values are present, computing the quantitative difference between the compared largest impact value and each impact value from the sorted plurality of impact values;
computing the quantitative difference for each impact value from the sorted plurality of impact values is computed; and
comparing the computed quantitative difference corresponding with each impact value from the sorted plurality of impact values to a threshold value to determine whether there is a significant difference between the compared largest impact value and each impact value from the sorted plurality of impact values.

6. The method of claim 2, wherein quantifying the impact associated with the identified one or more influential roads and the identified one or more influential routings associated with the object road, further comprises:
determining one or more significantly influential roads associated with the object road by utilizing a z-score method, wherein determining one or more significantly influential roads comprises:
computing a median of a plurality of impact values in a vector by the computed at least one Impact Matrix,
computing a median absolute deviation for the object road based on the computed median of the plurality of impact values,
computing a modified z-score for each of the influential roads from the identified one or more influential roads associated with the object road based on the computed median absolute deviation, and
detecting the one or more significantly influential roads is detected based on the computed modified z-score for each of the influential roads, wherein each of the influential roads that satisfies a positive impact z-score is considered one of the significantly influential road associated with the object road.

7. A computer system for detecting a plurality of influential factors for traffic congestion, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving as input an object road and a corresponding target road network via a communication network, wherein an impact of the influential factors affecting the object road and the target road network is measured and analyzed for further traffic control analysis;

identifying one or more influential roads and one or more influential routings associated with the object road in the target road network;

quantifying the impact associated with the identified one or more influential roads and the identified one or more influential routings associated with the object road that affect traffic on the object road, wherein at least one Impact Matrix is utilized to determine a road-by-road influence in connection to the target road network;

providing, to an external pre-defined system, a list of the identified one or more influential roads and the identified one or more influential routings associated with the object road with a plurality of impact values associated with each of the identified one or more influential roads and a plurality of impact values associated with each of the identified one or more influential routings;

analyzing the provided list based on the plurality of influential factors, wherein a guideline is provided to the external pre-defined system to analyze the provided list, wherein the guideline guides the external pre-defined system to analyze the one or more influential roads and the one or more influential routings with the highest impact values first; and generating a plurality of pre-estimate traffic results, wherein generating the plurality of pre-estimate traffic results includes executing a set of rules comprising:
utilizing the external pre-defined system to perform a what-if analysis, wherein the what-if analysis changes the plurality of impact values;
determining whether the changes in the plurality of impact values affect the one or more influential roads and/or the one or more influential routings associated with the object road; and
in response to determining the changes in the plurality of impact values affect the one or more influential roads and/or the one or more influential routings associated with the object road, identifying the influential factors that caused the one or more influential roads and/or the one or more influential routings associated with the object road to change.

8. The computer system of claim 7, wherein identifying the one or more influential roads and the one or more influential routings associated with the object road in the target road network, further comprises:
computing the at least one Impact Matrix,
wherein a first order Impact Matrix is associated with the one or more first order influential roads associated with the object road,
wherein a second order Impact Matrix is associated with the one or more second order influential roads associated with the object road; and
identifying the one or more influential roads and the one or more influential routings associated with the object road by utilizing one or more statistical detection methods,
wherein the one or more first order influential roads associated with the object road is identified, wherein the one or more second order influential roads associated with the object road is identified,
wherein the one or more influential routings associated with the object road is identified.

9. The computer system of claim 8 in which the computed Impact Matrix is calculated by combining a spatial correlation matrix and a network topology structure.

10. The computer system of claim 8, wherein quantifying the impact associated with the identified one or more influential roads and the identified one or more influential routings associated with the object road, further comprises:
determining at least one main influential group of first order roads associated with the object road by utilizing one or more statistical tests, wherein determining the at least one main influential group of first order roads comprises:
computing a plurality of impact values in a vector by the Impact Matrix,
sorting the computed plurality of impact values in descending order,
identifying a largest impact value from the sorted plurality of impact values,
comparing the identified largest impact value with a second largest impact value from the sorted plurality of impact values,
computing a quantified difference between the compared largest impact value and the compared second largest impact value, and
comparing the computed quantitative difference to a threshold value to determine whether there is a significant difference between the compared largest impact value and the compared second largest impact value.

11. The computer system of claim 10, further comprising:
in determining that three or more impact values from the plurality of impact values are present, computing the quantitative difference between the compared largest impact value and each impact value from the sorted plurality of impact values;
computing the quantitative difference for each impact value from the sorted plurality of impact values is computed; and
comparing the computed quantitative difference corresponding with each impact value from the sorted plurality of impact values to a threshold value to determine whether there is a significant difference between the compared largest impact value and each impact value from the sorted plurality of impact values.

12. The computer system of claim 8, wherein quantifying the impact associated with the identified one or more influential roads and the identified one or more influential routings associated with the object road, further comprises:
determining one or more significantly influential roads associated with the object road by utilizing a z-score method, wherein determining one or more significantly influential roads comprises:
computing a median of a plurality of impact values in a vector by the computed at least one Impact Matrix,
computing a median absolute deviation for the object road based on the computed median of the plurality of impact values, computing a modified z-score for each of the influential roads from the identified one or more influential roads associated with the object road based on the computed median absolute deviation, and detecting the one or more significantly influential roads is detected based on the computed modified z-score for each of the influential roads, wherein each of the influential roads that satisfies a positive impact z-score is considered one of the significantly influential road associated with the object road.

13. A computer program product for detecting a plurality of influential factors for traffic congestion, comprising:

one or more non-transitory computer-readable storage media and program instructions stored on at least one of the one or more non-transitory tangible storage media, the program instructions executable by a processor to cause the processor to perform a method comprising:

receiving as input an object road and a corresponding target road network via a communication network, wherein an impact of the influential factors affecting the object road and the target road network is measured and analyzed for further traffic control analysis;

identifying one or more influential roads and one or more influential routings associated with the object road in the target road network;

quantifying the impact associated with the identified one or more influential roads and the identified one or more influential routings associated with the object road that affect traffic on the object road, wherein at least one Impact Matrix is utilized to determine a road-by-road influence in connection to the target road network;

providing, to an external pre-defined system, a list of the identified one or more influential roads and the identified one or more influential routings associated with the object road with a plurality of impact values associated with each of the identified one or more influential roads and a plurality of impact values associated with each of the identified one or more influential routings;

analyzing the provided list based on the plurality of influential factors, wherein a guideline is provided to the external pre-defined system to analyze the provided list, wherein the guideline guides the external pre-defined system to analyze the one or more influential roads and the one or more influential routings with the highest impact values first; and generating a plurality of pre-estimate traffic results, wherein generating the plurality of pre-estimate traffic results includes executing a set of rules comprising:

utilizing the external pre-defined system to perform a what-if analysis, wherein the what-if analysis changes the plurality of impact values;

determining whether the changes in the plurality of impact values affect the one or more influential roads and/or the one or more influential routings associated with the object road; and in response to determining the changes in the plurality of impact values affect the one or more influential roads and/or the one or more influential routings associated with the object road, identifying the influential factors that caused the one or more influential roads and/or the one or more influential routings associated with the object road to change.

14. The computer program product of claim 13, wherein identifying the one or more influential roads and the one or more influential routings associated with the object road in the target road network, further comprises:

computing the at least one Impact Matrix, wherein a first order Impact Matrix is associated with the one or more first order influential roads associated with the object road, wherein a second order Impact Matrix is associated with the one or more second order influential roads associated with the object road; and identifying the one or more influential roads and the one or more influential routings associated with the object road by utilizing one or more statistical detection methods, wherein the one or more first order influential roads associated with the object road is identified, wherein the one or more second order influential roads associated with the object road is identified, wherein the one or more influential routings associated with the object road is identified.

15. The computer program product of claim 14, wherein quantifying the impact associated with the identified one or more influential roads and the identified one or more influential routings associated with the object road, further comprises:

determining at least one main influential group of first order roads associated with the object road by utilizing one or more statistical tests, wherein determining the at least one main influential group of first order roads comprises:

computing a plurality of impact values in a vector by the Impact Matrix, sorting the computed plurality of impact values in descending order, identifying a largest impact value from the sorted plurality of impact values, comparing the identified largest impact value with a second largest impact value from the sorted plurality of impact values, computing a quantified difference between the compared largest impact value and the compared second largest impact value, and comparing the computed quantitative difference to a threshold value to determine whether there is a significant difference between the compared largest impact value and the compared second largest impact value.

16. The computer program product of claim 15, further comprising:

in determining that three or more impact values from the plurality of impact values are present, computing the quantitative difference between the compared largest impact value and each impact value from the sorted plurality of impact values;

computing the quantitative difference for each impact value from the sorted plurality of impact values is computed; and comparing the computed quantitative difference corresponding with each impact value from the sorted plurality of impact values to a threshold value to determine whether there is a significant difference between the compared largest impact value and each impact value from the sorted plurality of impact values.

17. The computer program product of claim 14, wherein quantifying the impact associated with the identified one or more influential roads and the identified one or more influential routings associated with the object road, further comprises:

determining one or more significantly influential roads associated with the object road by utilizing a z-score method, wherein determining one or more significantly influential roads comprises:

computing a median of a plurality of impact values in a vector by the computed at least one Impact Matrix, computing a median absolute deviation for the object road based on the computed median of the plurality of impact values, computing a modified z-score for each of the influential roads from the identified one or more influential roads associated with the object road based on the computed median absolute deviation, and detecting the one or more significantly influential roads is detected based on the computed modified z-score for each of the influential roads, wherein each of the influential roads that satisfies a positive impact z-score is considered one of the significantly influential road associated with the object road.

* * * * *